United States Patent Office 3,559,479
Patented Feb. 2, 1971

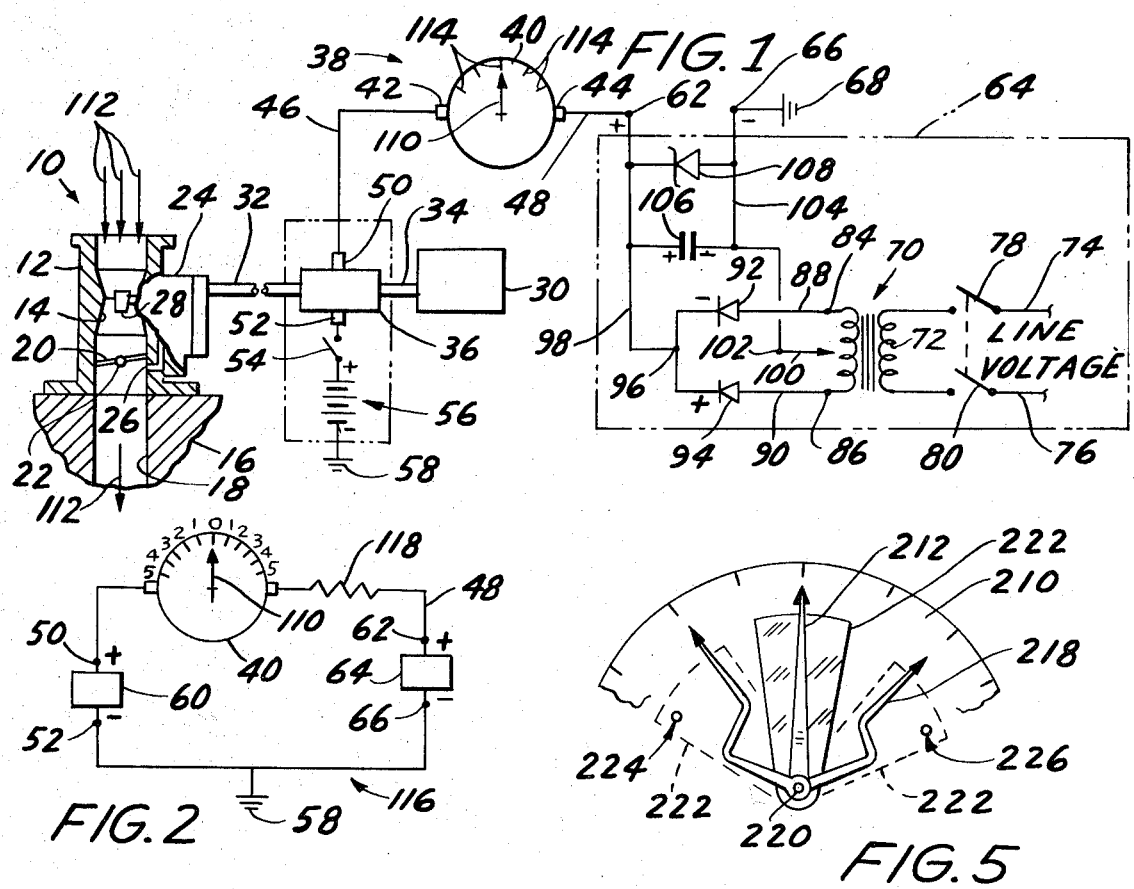

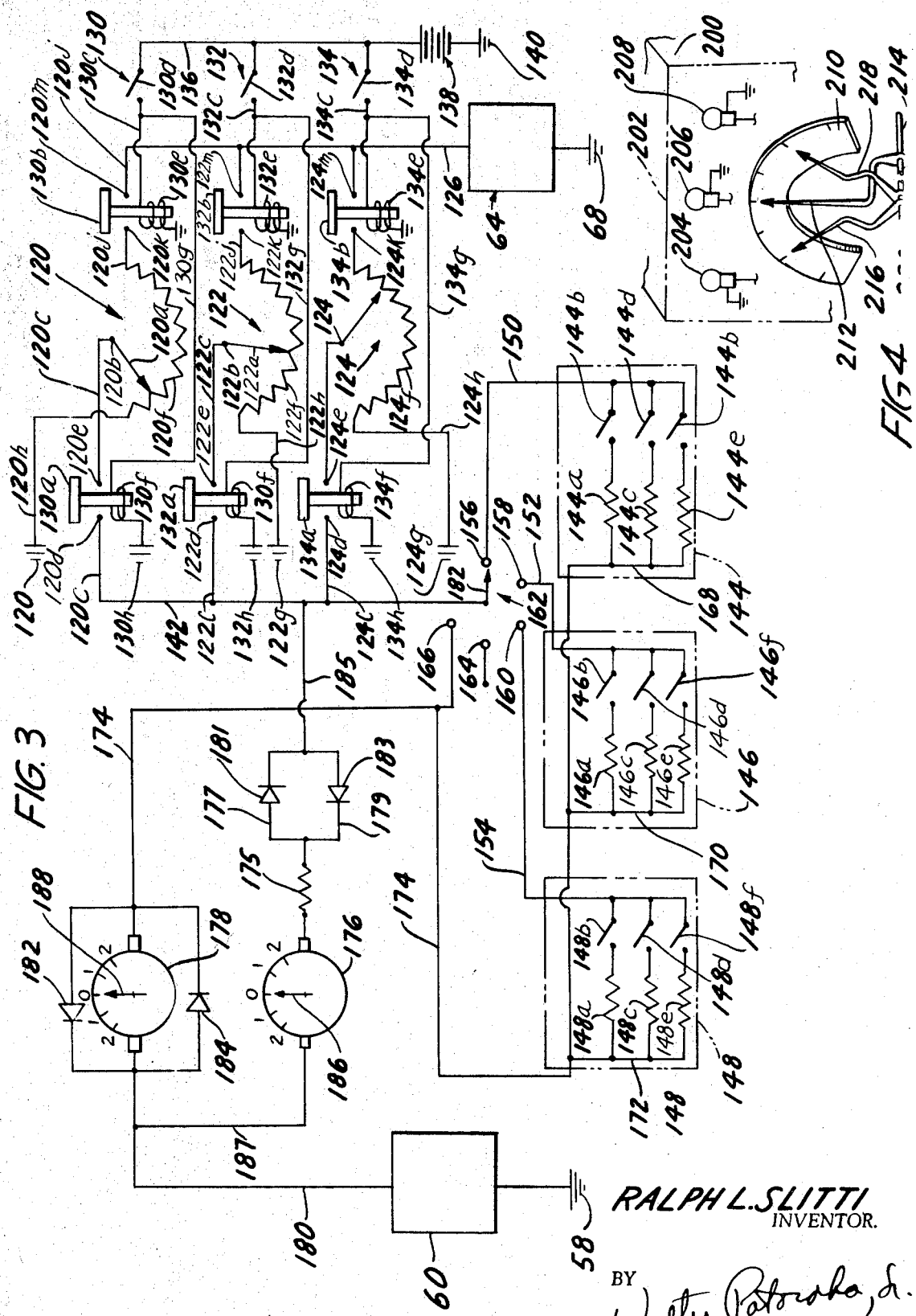

3,559,479
FLUID FLOW GAUGING APPARATUS
Ralph L. Slitti, Detroit, Mich., assignor to Holley Carburetor Company, Warren, Mich., a corporation of Michigan
Filed Dec. 18, 1967, Ser. No. 691,316
Int. Cl. G01f 7/00
U.S. Cl. 73—196                                   4 Claims

ABSTRACT OF THE DISCLOSURE

An ammeter, of sufficient rating and sensitivity, has one of its terminals electrically connected to a first source of variable voltage comprising a fluid transducer which produces a first voltage of a magnitude corresponding to the rate of fluid flow therethrough and a second source of reference voltage which produces a second voltage of a predetermined magnitude indicative of a desired rate of fluid flow is electrically connected to an other terminal of said ammeter. The ammeter being effective, upon being exposed to said first and second voltages of equivalent value, to indicate a matching of the fluid flow rate through the transducer to the desired rate of fluid flow.

BACKGROUND OF THE INVENTION

Carburetors for use in combination with internal combustion engines are required to emit fuel to the engine in a predetermined ratio to the air passing through the carburetor and into the engine. However, in the situations where the engine is employed in transportation vehicles the engine speed cannot remain constant and more often than not, the air-fuel ratio has to be capable of change depending upon whether maximum economy or maximum power of the engine is desired. In order to be assured that a particular carburetor does provide proper air-fuel ratios for varying engine operating conditions (reflected by the engine intake manifold vacuum) the carburetor is first tested under conditions simulating such engine operating conditions.

Heretofore it has been the practice to secure the carburetor onto a test fixture and, after positioning the carburetor throttle valve in a predetermined position, create a particular rate of air flow through the carburetor induction passage past the carburetor throttle valve. The quantity of air utilized was measured through the principle of displaced volume. Also, the air flow would cause fuel (or other liquid having physical characteristics much as those of gasoline fuel) to be emitted by the carburetor. The quantity of fluid so discharged through the carburetor would be measured and the air-fuel ratio, for the particular operating condition under which the carburetor was being tested, would be calculated by these empirically determined quantities. Not only is this process time consuming but it is also, at best, a close approximation of the actual fuel-air ratio because all the individual measurements are susceptible to error.

Such testing procedures, even neglecting the effect that variations in temperature will exhibit on the fluid density, usually required the operator conducting the tests to manipulate controls as well as to visually observe and record various manometer readings. Quite often the demands on physical dexterity was such as to require two operators to work as a team. This, in turn, required vocal communication in attempts to synchronize their movements and readings of gauges and meters.

In view of the above, it is apparent that testing procedures for determining fluid flow rates were not only time consuming and costly but that there were many opportunities for the introduction of errors (of unknown magnitudes) into the empirically determined quantity of fluid flow.

SUMMARY OF THE INVENTION

A first signal producing means responsive to fluid flow produces a first signal of a magnitude corresponding to rate of flow of a fluid and a second signal producing means produces a substantially stable second signal of a magnitude indicative of a predetermined desired rate of flow of said fluid; the first and second signals are communicated to indicator means effective to automatically produce a resultant signal, which resultant signal, may be indicative of the attainment of the desired rate of flow of said fluid under flow or a deviation in rate of flow of said fluid under flow from the desired rate of flow of said fluid.

Accordingly, a general object of this invention is to provide a gauging apparatus for automatically indicating if a particular fluid flow is equivalent to a predetermined desired rate of flow of said fluid.

Another object of this invention is to provide a gauging apparatus for both automatically indicating if a particular flow of fluid is equivalent to a predetermined desired rate of flow of said fluid and, if not, for indicating whether said flow of fluid is less than or greater than said predetermined desired rate of flow of said fluid.

Another more specific object of this invention is to provide a gauging apparatus for both automatically indicating if a particular flow of fluid is equivalent to a predetermined desired rate of flow of said fluid and, if not, for indicating whether said flow of fluid is less than or greater than said predetermined desired rate of flow of said fluid and to further indicate the percentage of deviation that said flow of fluid deviates from the said desired rate of flow of said fluid.

Other more specific objects and advantages of the invention will become apparent when reference is made to the following description considered in conjunction with the drawings.

DESCRIPTION OF THE DRAWINGS

In the accompanying drawings:
FIG. 1 is a schematic wiring diagram including certain diagrammatically illustrated elements comprising the invention;
FIG. 2 is a simplified wiring diagram, based on the circuitry of FIG. 1, including a modification thereof;
FIG. 3 is another wiring diagram, based on the circuitry of both FIGS. 1 and 2, including a further modification thereof; and
FIGS. 4 and 5 are fragmentary pictorial representations of a particular meter or gauge particularly suitable for use in at least one form of the invention.

DESCRIPTION OF THE PREFERRED EMBODIMENTS

Referring now in greater detail to the drawings, FIG. 1 illustrates a carburetor 10 operatively connected to circuitry, constructed in accordance with the teachings of this invention. Carburetor 10 comprised of a body 12, with an induction passage 14 formed therethrough, is suitably secured to a test fixture 16 also provided with a passage 18 therein. A throttle valve 20 located within the induction passage 14 is adapted to be rotated by a throttle shaft 22 and suitable linkage (not shown). Carburetor 10 is also provided with a fuel reservoir or bowl 24 which serves to feed or supply fuel to the idle fuel system passages, such as at 26, as well as the main fuel system including the main fuel nozzle 28. The fuel bowl 24 may be connected to a source 30 of additional fuel as by conduits 32 and 34 with a mass flow transducer 36 serially situated therebetween. Although many fluid transducers are acceptable in the practice of this invention, it has been found that excellent results can be obtained with a commercially available transducer called, Flowtron Mass Flow Transducer, manufactured by the Foxboro Company of Foxboro, Mass.

The circuitry 38 is comprised of an ammeter 40 having terminals 42 and 44 to which are respectively connected electrical conductors 46 and 48. The other end of conductor 46 is connected to output terminal 50 of the mass flow transducer 36. The other terminal 52 of transducer 36 is electrically connected, through a switch member 54, to one terminal of a suitable source of electrical potential 56 which may be a regulated voltage supply or a battery. The other terminal of the source of electrical potential 56 is electrically connected to ground as at 58. Generally, the transducer 36 and source of electrical potential 56 may, in combination, be considered as a source of variable voltage 60; that is, even though source 56 is regulated, transducer 36 will produce only that voltage value which conforms to the value of the parameters sensed by the transducer 36.

The other end of conductor 48 is connected to a terminal 62 of a regulated source of electrical potential 64 while the other terminal 66 of source 64 is electrically connected to ground potential as at 68.

The regulated source 64 may be comprised of a stepdown transformer 70 having a primary winding 72, adapted for connection to the line voltage conductors 74 and 76 as by switch members 78 and 80, and a secondary winding 82 having its terminals 84 and 86 electrically connected to conductors 88 and 90 which have diodes 92 and 94 respectively serially connected therein. Conductors 88 and 90 are connected to each other at a terminal point 96 from which a conductor 98 leads to terminal 62. A center top contact 100 is connected, as at its terminal 102, to a conductor 104 leading to ground terminal 66. Further, a capacitor 106 and a Zener diode 108 are connected, in parallel relationship to each other, across conductors 98 and 104.

In view of the above and FIG. 1, it can be seen that the voltages of both electrical sources 60 and 64 are (+) plus in sign and opposed to each other. Accordingly, as a general statement, it can be said that if the transducer voltage, $V_t$, is greater than the reference voltage, $V_r$, current will then flow from source 60 to source 64 and the indicator needle 110 of ammeter 40 will rotate some amount clockwise to visually indicate such direction of current flow. The converse is also true.

In testing the carburetor 10, a predetermined vacuum may be created in conduit 18, downstream of throttle valve 20, causing air to flow past the throttle valve 20, as generally depicted by the arrows 112. (The throttle valve 20 may actually be positioned in any one of a number of predetermined partially open or even a fully opened position.) The flow of such air causes fuel (or other fluid having the same general physical characteristics as fuel but one which is less susceptible to ignition) to flow out of either the idle fuel system or the main fuel system. As the fuel is being so used the fuel or test fluid reservoir 30 replenishes the fluid to the fuel bowl 24 at the same rate at which the test fluid is consumed or delivered by the carburetor to the air stream 112. The test fluid delivered by the reservoir 30 passes through conduits 34 and 32 as well as the mass flow transducer 36 which produces a voltage in accordance therewith. Therefore, if it is, for example, empirically determined that a desired fuel flow (at a particular test condition) causes a particular value of transducer voltage, $V_t$, to exist, the reference voltage, $V_r$, is then established to where both voltages are equal to each other ($V_t = V_r$). Accordingly, if any carburetor under test produces a fluid flow equal to the desired fluid flow, no movement of the indicator needle 110 from its zero position will be experienced because at this time $V_t$ equals $V_r$. However, if the test carburetor produces either a greater or lesser fluid flow than desired then the indicator needle 110 will move either clockwise or counterclockwise, respectively, because under such conditions the transducer voltage, $V_t$, is respectively greater or less than the reference voltage, $V_r$. Acceptable tolerances to such variations may, of course, be established by the proper selection of limits expressed as possibly graduations 114 on the face of the ammeter 40.

FIG. 2 illustrates, in a simplified manner, a circuit 116 which may be considered equivalent to the circuit 38 of FIG. 1 with the exception that circuit 116 includes resistor means 118 connected in series with terminal 62 of electrical source 64 and terminal 44 of ammeter 40.

If in the circuitry of FIG. 2, the transducer voltage, $V_t$, is equal to the reference voltage, $V_r$, resistor 118 displays no effect because the voltages are equal but opposed to each other thereby precluding any current flow through resistor 118. In such event the indicator needle 110 would remain in its zero or null position. However, the use of proper current limiting means such as resistor 118 enables the difference between the two input signals ($V_t$ and $V_r$) to be expressed on the meter 40 as a ratio or percentage deviation from the selected reference voltage. This can be achieved as follows:

(A) First, let it be assumed that the regulated voltage is a constant 10.0 volts.

(B) Second, let it be assumed that meter 40 is selected so as to deflect linearly and that its full scale deflection in either direction (represented by the graduation markers of 0 to 5 on both the left and right sides of the meter 40 in FIG. 2) at a current flow of 50 microamps.

(C) Next, let it be assumed that the voltage from source 60, $V_t$, is 0.10 volt greater than the reference voltage, $V_r$, of source 64. This is an actual 1% deviation from the assumed voltage of 10.0 volts for $V_r$.

(D) Next, let it be assumed that a full scale deflection (50 microamps) of the meter is to represent an actual percentage voltage deviation of 5% from the assumed 10.0 $V_r$.

(E) If a full scale deflection represents 5% voltage deviation, it follows that a 1.0% voltage deviation is ⅕ of the full scale deflection which, in this instance, would be represented by either of the number "1" graduations on the face of meter 40. Further, since a full scale deflection represents 50 microamps, it also follows that a ⅕ of the full scale deflection represents only 10 microamps.

(F) The value of the resistance 118 which would provide such a deflection to the first graduation may be calculated through the use of Ohm's Law which is $V = I \cdot R$ (G) $V = I \cdot R$ where:

(1) $\qquad V = 0.10$ volt
(2) $\qquad I = 10 \times 10^{-6}$ amperes therefore, $$R = V/I$$

of $$R = \frac{0.10}{10 \times 10^{-6}} = \frac{10^{-1}}{10^{-5}} = 10,000.0 \text{ ohms}$$

accordingly, resistor 118 must be 10,000.00 ohms in order to achieve a deflection to the first graduation when a 1.0% voltage deviation exists as between $V_t$ and $V_r$ where the percentage deviation is based on 10.0 volts.

The above is, of course, also true where the value of $V_r$ is greater than $V_t$. However, the percentage of voltage deviation is still based on the value of $V_r$.

Accordingly, in view of the above it can be seen that if a carburetor under test actually caused the transducer 60 to produce a voltage of 10.1 volts ($V_t$), which is 1.0% greater than the reference voltage of 10.0 volts ($V_r$), the meter needle would swing from its zero or null point to the first graduation which, in the assumed situation, indicates a 1.0% deviation in voltage. This percentage is, of course, directly reflective of the fuel or fluid flow deviation from the desired flow rate or, in other words, indicates a 1.0% deviation from the desired flow rate. The deviation, whether it be in excess of or less than the desired flow rate, is indicated by the direction of deflection of the meter needle.

In view of the above it should be apparent that if the various ratios were chosen so that full scale deflection of the meter 40 were to represent a 10.0% voltage deviation rather than the previously assumed 5.0%, then twice the current flow would be required to deflect the needle one-fifth of the total distance of the full scale deflection.

Accordingly, this means that the difference in voltage signal would have to be 0.20 volt and that:

$$R = \frac{.20}{10 \times 10^{-6}} = 20,000 \text{ ohms}$$

This then is the resistance value which would allow the meter needle 110 to deflect to the first graduation (a 10.0 microampere deflection of the meter needle) when the difference in voltage signals is 2.0% of the reference voltage of 10.0 volts ($V_r$).

Of course, it should be remembered that if the two voltage signals are equal ($V_t = V_r$) then there will be no current flow and the meter needle 110 will remain at its zero or null point. This will happen when the carburetor under test matches the desired flow rate.

FIG. 3 schematically illustrates a testing arrangement constructed in accordance with the teachings of the invention disclosed and described with reference to FIGS. 1 and 2.

In FIG. 3, a plurality of voltage dividing circuits 120, 122 and 124 adapted to be at times selectively placed in circuit with the source 64 of reference voltage as by a conductor 126. For example, the dividing circuit 120 may be comprised of a potentiometer having a wiper contact 120a connected as at 120b to a conductor 120c which has electrical contacts 120d and 120e. The potentiometer resistance 120f is connected at one end to ground 120g, as by a conductor 120h, and connected at its other end to an electrical conductor 120j having contacts 120k and 120m. The other end of conductor 120j is connected to conductor 126 leading to voltage source 64. In each of the voltage dividing circuits 120, 122 and 124 the various elements bearing a letter suffix correspond to those elements of voltage dividing circuit 120 having a like suffix.

Each of the voltage dividing circuits is provided with a related switching circuit such as at 130, 132 and 134. The switching circuits, such as, for example, circuit 130 may be comprised of a first normally open relay type switch member 130a, adapted to cooperate with contacts 120d and 120e in order to complete the circuit through conductor 120c, and a second normally open relay type switch member 130b, adapted to cooperate with contacts 120k and 120m in order to complete the circuit through conductor 120j. A conductor 130c, with a manually actuable switch 130d in series therein, is connected at one end to a main conductor 136 which, in turn is connected to one terminal of a suitable source of electrical potential 138 suitably grounded as at 140. The other end of conductor 130c is connected to a relay coil 130e which, upon energization, causes the switch member to close across contacts 120k and 120m. A second relay coil 130f, provided for actuation of switch member 130a, is connected at one end, as by a conductor 130g, to conductor 130c and connected at its other end to ground potential as at 130h thereby being in parallel with relay coil 130e. Closure of manual switch 130d causes energization of relay coils 130e and 130f resulting in relay switch members 130b and 130a completing the circuits through their respective cooperating contacts. As a consequence, a circuit is completed from reference source 64, conductor 126, through conductor 120j and a portion of a potentiometer resistor 120f, through wiper contact 120a, conductor 120c (including switch 130a and contacts 120d and 120e) to another main conductor 142.

In each of the switching circuits 130, 132 and 134 the various elements bearing a letter suffix correspond to those elements of switching circuit 130 having a like suffix.

A plurality of groups of resistors 144, 146 and 148, respectively connected by main conductors 150, 152 and 154 to contacts 156, 158 and 160 of a rotatable switch assembly 162, are adapted to be selectively placed in circuit with the voltage divider circuits 120, 122 and 124.

Referring to group 144 (which in actual practice may be comprised of a plug-in type of a card carrying a group of resistors) it can be seen that a first resistor 144a and a manually actuated switch 144b are in series circuit with respect to each other and are, in turn connected to the main conductor 150 at one end and to another main conductor 168 at the other end. In like fashion resistor 144c and switch 144d as well as resistor 144e and switch 144f are respectively in series and across conductors 150 and 168. The resistors and switches in groups or cards 146 and 148 bearing a letter suffix correspond to those resistors and switches of group 144 having a like suffix to the extent of their general arrangement, except that in group 146 they are respectively connected across main conductor 152 and another conductor 170 and in group 148 they are respectively connected across main conductor 154 and another conductor 172.

Each of the conductors 168, 170 and 172 are, in turn, connected to a conductor 174 which leads to one of a plurality of meters 176 and 178 which are functionally equivalent, in the broad sense, to the meter 40 of FIGS. 1 and 2. In this arrangement, as in FIGS. 1 and 2, the meters are basically ammeters of the galvonometer type and they are selected with respect to each other so that meter 178 is very sensitive and is allowed to deflect off scale except in instances of small percentage of voltage deviation. Accordingly, meter 178 can be considered as a vernier device. Meter 176, comparatively insensitive and therefore considered a coarse meter device, is connected at one end to a resistor 175 which, in turn, is connected to parallel branch conductors 177 and 179 respectively containing therein diodes 181 and 183. The branch circuits or conductors 177 and 179 are in turn connected to conductor 142 as by a conductor 185. The other end of meter 176 is electrically connected to conductor 180 as by a conductor 187. This arrangement becomes particularly useful in situations where an operator may be testing a carburetor at a particular fuel or fluid flow check point which, in the carburetor, is one capable of adjustment. Accordingly, if that particular carburetor under test does not produce the desired fluid flow rate then the operator, by observing the coarse meter 176 can adjust the carburetor to get a coarse meter reading close to the null point and then obtain a very accurate null or zero reading through observing the needle of the vernier meter 178. The meters 176 and 178 are in turn connected to the transducer 60 as by a conductor 180. Preferably, silicon diodes 182 and 184, poled as indicated, are connected in parallel with vernier meter 178 and function as meter-protection-diodes.

It should be pointed out that the resistor 175, permanently in circuit with the coarse meter 176, is of a large resistance value. This is possible because the function of the comparatively insensitive meter 176 is merely to act as a general indicator and not determine particular percentages of error as does the vernier meter 178. Further, the blocking action of diodes 181 and 183 enable the coarse meter 176 to effectively be taken out of the overall circuit at voltage values of $V_t$ and $V_r$ approaching the null point.

In actual operation, the carburetor or other fluid flow device under test, is usually required to be tested at a plurality of test points which represent various carburetor operating conditions. Accordingly, if it is assumed, for purposes of illustration that only three test points are required, then a master carburetor (or other master device) is arranged generally as shown in FIG. 1 and switch member 182 of rotary switch assembly 162 (FIG. 3) is rotated to a point shunting groups 144, 146 and 148 and contacting an electrical contact such as 166 which may be connected to conductor 174.

The master carburetor is then set-up under the first test point operating conditions and switch 130d is closed thereby completing a circuit from voltage source 64, through potentiometer resistance 120f and wiper contact 120a, through meters 176 and 178 to the transducer voltage source 60. The potentiometer wiper contact 120a is then adjusted until the needles 186 and 188 of meters 176 and 178 indicate a zero or null position. This then establishes the desired value of the first reference voltage, $V_{r-1}$, for the first test point which corresponds to the fluid or fuel flow at that test point.

The master carburetor is then set-up under the second operating condition and, with switch 130d opened, switch 132d is closed thereby completing a second circuit similar to that previously described but in this case excluding potentiometer resistor 120f and including the potentiometer resistance 122f. The adjustment procedure is repeated with wiper contact 122a until a null point is again attained thereby establishing the value of the second reference voltage, $V_{r-2}$.

The above procedures are repeated with respect to voltage dividing circuit 124 and switching circuit 134 in order to establish the value of the third reference voltage, $V_{r-3}$, at the third test point representing the third operating condition.

Having thusly adjusted the setting of each of the wiper contacts of the respective potentiometers, and therefor varying voltages values $V_{r-1}$, $V_{r-2}$ and $V_{r-3}$ to be ememployed as reference voltages, it then becomes possible to calculate the value of resistors 144a, 144c and 144e of the group or card 144 by employing the method disclosed with reference to FIG. 2. Without repeating the calculations, it is evident that if at the first test point a permissible variation in the test carburetor is 1.0% that based on the reference voltage of $V_{r-1}$ and the known amperage for deflecting the vernier meter needle 188 full scale, it is possible to calculate the corresponding required value of resistance of resistor 144a which, when placed in circuit with meters 176 and 178 and voltage dividing circuit 120, will result in the deflection of needle 188 to some preselected point such as the first graduation on the meter scale.

The resistances of resistors 144c and 144e are determined in the same manner, for the permissible percentage duration at the second and third test points when in circuit with voltage dividing circuits 122 and 124, respectively.

The resistance values of resistors 146a, 146c and 146e of group 146 as well as resistors 148a, 148c and 148e of group 148 would be established in the same manner as that described with reference to the resistors of group 144.

If, as already set forth, the reference voltages $V_{r-1}$, $V_{r-2}$ and $V_{r-3}$ are established on the basis of a master carburetor (or other master flow device) then the resistors of the three groups 144, 146 and 148 are intended to be used in testing three other carburetors (or other flow devices comparable to the master flow device). For example, if it is assumed that the carburetors to be tested fall into three groups A, B and C then it can be assumed that the resistors of group 144 will be employed, in combination with the voltage dividing circuits, for testing group A carburetors at the established three check points. Similarly, the resistors of groups 146 and 148 would be employed for respectively testing group B and C carburetors.

During the actual testing of, for example, a group A carburetor, the carburetor would be placed in a suitable fixture as indicated in FIG. 1 and operatively connected to the transducer 36 with the throttle valve 20 and air flow established in accordance with the dictates of the first test point. Switch 130d would be closed completing the voltage dividing circuit from source 64 to rotary switch member 182. With switch 182 contacting electrical contact 156 the circuit is then completed to conductor 150.

Next, the switch 144b is closed thereby completing the remaining circuit to and including variable voltage source (transducer 36) 60. If the carburetor liquid or fuel flow rate exactly matches the desired fluid flow rate, no voltage potential exists and therefore no current flow is produced through the meters 176 and 178. Consequently, both needles 186 and 188 will remain at the null or zero position. However, if the fluid flow rate is not exactly that desired, but nevertheless within the assumed tolerance of 1.0% permissible duration then the meter needles will be between zero and that graduation on the meters previously established to represent the permissible 1.0% deviation. Further, if the fluid flow rate is in excess of that permissible deviation, then the meter needles would both be positioned beyond that graduation on the meter scale previously determined to indicate permissible deviation.

Upon completion of the first check point switches 130d and 144b would be opened. The carburetor throttle 22 would be repositioned and the air flow changed to simulate the operating conditions of the second check point. Next, switches 132d and 144d would be closed establishing a circuit through potentiometer resistor 122f, resistor 144c, meters 176 and 178 and variable voltage source 60. After the readings of the meters 176 and 178 were checked, switches 132d and 144d would be opened the carburetor re-set for the operating conditions of the third test point and switches 134d and 144b closed in order to establish the circuit through the third test point potentiometer resistor 124f and resistor 144e.

The above procedure would be employed in checking carburetors of groups B and C except that in such situations the rotary switch member 182 would be moved, respectively, to contacts 158 and 160 in order to employ the corresponding resistor groups 146 and 148.

In view of the above it should be apparent that in place of relays 130a, 130b and switch 144b, simultaneous operation can be effected through use of normally open contacts on a relay actuated by switch 130d. Subsequent actuation of switch 132d activates relays 132a, 132b and switch 144d while switch 130d becomes deactivated.

In some instances it might be advantageous to replace any or all of the meters, as shown in FIGS. 1, 2 and 3 with a meter or meters which provide a ready sensory indication, of the results of the various test points, other than merely a needle indicator position. This can be easily accomplished by employing one or more photo-optic relay meters. In arrangements where both coarse and vernier meters are employed, the photo-optic relay meter would be used as the vernier meter. As is well known in the art, a photo-optic relay meter is a double set point (on both sides of the zero or null point), sensitive microammeter incorporating the use of relays which, in turn, are controlled by photo-optic devices.

Although various photo-optic relay meters of specific construction are available, FIGS. 4 and 5 illustrate the general arrangement of such a meter.

For example, referring to FIG. 4, the photo-optic relay 200 could be comprised generally of a housing 202 which contains a plurality of bulbs 204, 206 and 208 which, as will become apparent, are adapted to be selectively lit (energized) in accordance with the response of the meter to the current flow through the meter. The meter may be provided with a scale 210, having graduations thereon, and an indicator needle 212 which is suitably mounted on an armature shaft 214. The needle 212, of course will deflect in either direction of the scale center or null point depending on the direction of current flow.

Set point needles 216 and 218 are illustrated as being mounted on a suitable pivot shaft 220. Although not specifically shown, the set indicators 216 and 218 can be operatively connected to adjusting mechanism well known in the art whereby their respective positions along the scale 210 can be varied to any desired point or graduation. Further, as generally indicated in FIG. 5, a masking device 222 is operatively connected to indicator needle 212 so as to swing or move in unison. Additionally, each of the set needles 216 and 218 carry respective photo-optic devices 224 and 226 so as to be moved in accordance with the movement of set needles 216 and 218. Accordingly, if the set needles were adjusted to indicate the percent of permissible deviation, as described with reference to FIGS. 2 and 3, it can be seen, as generally depicted in FIG. 5, that when the indicator needle 212 deflected to a point equivalent to that determined by, for example, set needle 218 that the mask 222 would interrupt the photo-optic device 226 and cause an appropriate response in the energization of the bulbs 204, 206 and 208. Similarly, if sufficiently deflected to the left the mask would interrupt the photo-optic device 224 and again produce a visual signal or indication at the same bulbs.

In such an arrangement, when the indicator needle 212 deflected to that point determined by set needle 218, the associated circuitry of bulb 208 would be closed causing bulb 208 to be energized. Simultaneously, the circuitry respectively associated with bulbs 204 and 206 would be opened. In similar fashion, when indicator needle 212 deflects to that point determined by set needle 216, bulb 204 is energized while bulbs 206 and 208 remain deenergized. However, whenever the indicator needle 212 is between the limits of set needles 216 and 218 bulbs 204 and 208 remain deenergized while bulb 206 is energized.

As a consequence of the above, it then becomes a simple matter for the operator to determine if the carburetor under test is or is not within the prescribed limits of deviation depending on whether or not certain of the bulbs are energized.

Although only a select number of embodiments of the invention have been disclosed and described, it is apparent that other embodiments and modifications of the invention are possible within the scope of the appended claims.

I claim:

1. A carburetor fluid flow testing apparatus, comprising a single source of fuel-like fluid, a conduit connected to said source and adapted to be connected to said carburetor, a mass flow transducer connected in and forming a part of said conduit, said transducer having a regulated source of electrical power and being adapted to produce a first voltage output of a magnitude reflective of the total actual flow rate of said fuel through said conduit, an ammeter having a zero-center scale and a main pointer, a conductor connected between the output of said transducer and one side of said ammeter, a regulated second voltage output source of electrical power free of any fluid flow means and connected by a conductor to the other side of said ammeter, said second output being a substantially constant reference of a magnitude reflective of the desired fuel flow through said conduit, said ammeter pointer reading zero when said first and second voltage outputs are equal to indicate that actual flow is equal to desired flow, and said pointer reading on either side of zero when said first and second voltage outputs are not equal to indicate that actual flow is more or less than desired flow.

2. Apparatus such as that recited in claim 1, wherein said ammeter is calibrated to indicate percentage deviation between actual flow and desired flow.

3. Apparatus such as that recited in claim 1, wherein said ammeter is of the photo-optic relay type in which said main pointer is positioned off-zero by electrical current caused to flow as a result of deviation between said first and second output voltages, said main pointer having a mask element, said ammeter also having a pair of set pointers, at permissible deviation values, said set pointers each including one photo-optic element, said meter having a plurality of lamps, one lamp being connected electrically so as to be energized only when said main pointer is positioned between said set pointers and the other of said lamps being connected electrically so that one or another lamp is energized when said main pointer is positioned on one or the other side of zero to the extent that said mask covers one or the other of said photooptic elements.

4. Apparatus such as that recited in claim 1, wherein means are provided for selecting one of a plurality of said second output voltages each reflective of a desired flow.

References Cited

UNITED STATES PATENTS

| | | | |
|---|---|---|---|
| 1,162,475 | 11/1915 | Gibson | 73—196 |
| 2,393,708 | 1/1946 | Reichel | 73—196 |
| 3,425,278 | 2/1969 | Buzza | 73—196 |

RICHARD C. QUEISSER, Primary Examiner

J. K. LUNSFORD, Assistant Examiner